(12) United States Patent
McAuley et al.

(10) Patent No.: US 12,031,403 B2
(45) Date of Patent: Jul. 9, 2024

(54) AUTOMATIC CHOKING HYDRAULIC SHOCK REDUCTION VALVE

(71) Applicant: Hydril USA Distribution LLC, Houston, TX (US)

(72) Inventors: Alexander McAuley, Houston, TX (US); Thuc Ngoc Nguyen, Ho Chi Minh (VN); Claudia Leon, Houston, TX (US); Alexander Woodruff-Hall, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 0 days.

(21) Appl. No.: 17/468,077

(22) Filed: Sep. 7, 2021

(65) Prior Publication Data

US 2023/0075775 A1 Mar. 9, 2023

(51) Int. Cl.
| | |
|---|---|
| *E21B 33/064* | (2006.01) |
| *E21B 21/10* | (2006.01) |
| *E21B 33/035* | (2006.01) |
| *E21B 33/06* | (2006.01) |

(52) U.S. Cl.
CPC ............ *E21B 33/064* (2013.01); *E21B 21/10* (2013.01); *E21B 33/0355* (2013.01); *E21B 33/061* (2013.01)

(58) Field of Classification Search
None
See application file for complete search history.

(56) References Cited

U.S. PATENT DOCUMENTS

| | | | | |
|---|---|---|---|---|
| 4,709,900 A | * | 12/1987 | Dyhr ...................... | E21B 21/10 251/63.4 |
| 4,871,035 A | * | 10/1989 | Ekwall ..................... | E21B 1/30 92/85 B |
| 5,186,393 A | * | 2/1993 | Yie .......................... | B05B 1/306 251/63.4 |
| 6,745,838 B2 | * | 6/2004 | Watson .................. | E21B 34/04 166/310 |
| 6,779,543 B2 | * | 8/2004 | Hollister ................. | E21B 33/06 137/112 |
| 9,429,010 B2 | | 8/2016 | Winters | |

(Continued)

FOREIGN PATENT DOCUMENTS

| | | |
|---|---|---|
| KR | 101588569 | 1/2016 |
| WO | 00/71919 | 11/2000 |
| WO | 2013/192494 | 12/2013 |

OTHER PUBLICATIONS

International Search Report and Written Opinion mailed Dec. 28, 2022 in corresponding PCT Application No. PCT/US2022/075824.

(Continued)

*Primary Examiner* — Matthew Troutman
*Assistant Examiner* — Douglas S Wood
(74) *Attorney, Agent, or Firm* — Osha Bergman Watanabe & Burton LLP

(57) ABSTRACT

A valve for preventing hydraulic shock and water hammer in downstream equipment, the valve including a valve body with an internal oil dampening chamber, an orifice arranged within the oil dampening chamber, a flow dampener positioned between the valve inlet and the orifice, and a spring between the valve body and the orifice. The valve is pressure compensated based on the ambient fluid pressure.

21 Claims, 7 Drawing Sheets

SECTION Y-Y
SCALE 2.000

(56) References Cited

U.S. PATENT DOCUMENTS

| | | |
|---|---|---|
| 10,156,113 B2 | 12/2018 | Gustafson |
| 10,982,492 B1 * | 4/2021 | Gopalan ................. E21B 17/07 |
| 2012/0145939 A1 * | 6/2012 | Rimboym ............. F16K 5/0605 |
| | | 251/315.01 |
| 2018/0231135 A1 * | 8/2018 | Matteucci ........... F16K 31/1221 |

OTHER PUBLICATIONS

Jianhong Fu et al., "Wellbore annulus water hammer pressure prediction based on transient multi-phase flow characteristics," Dec. 5, 2019, Oil Gas Sci. Technol.—Rev. IFP Energies nouvelles, vol. 74, 11 pages.

A. Andersen et al., "Downhole blowout preventer," Sep. 30, 2001, SPE Annual Technical Conference and Exhibition, New Orleans, Louisiana, 7 pages, abstract only.

* cited by examiner

AUTOMATIC CHOKING HYDRAULIC SHOCK REDUCTION VALVE

BACKGROUND

Field of Invention

This invention relates in general to fluid flow control and more particularly, to water hammer and hydraulic shock reduction systems.

Description of the Prior Art

Oil and gas field operations typically involve drilling and operating wells to locate and retrieve hydrocarbons. Rigs are positioned at well sites in relatively deep water. Tools, such as drilling tools, tubing, and pipes are deployed at these wells to explore submerged reservoirs. It is important to prevent spillage and leakage of fluids from the well into the environment. A significantly large pressure kick can result in a "blowout" of drill pipe, casing, drilling mud, and hydrocarbons from the wellbore, which can result in failure of the well.

Blowout preventers ("BOPs") are commonly used in the drilling and completion of oil and gas wells to protect drilling and operational personnel, as well as the well site and its equipment, from the effects of a blowout. In a general sense, a blowout preventer is a remotely controlled valve or set of valves that can close off the wellbore in the event of an unanticipated increase in well pressure. Modern blowout preventers typically include several valves arranged in a "stack" surrounding the drill string. The valves within a given stack typically differ from one another in their manner of operation, and in their pressure rating, thus providing varying degrees of well control. Longevity and reliability of the BOPs is critical for safe functioning of oil wells.

A typical BOP stack is made up of several ram preventers, topped off with an annular preventer. If a kick is detected, the annular BOP is usually closed first and then the ram is used as a backup if the annular BOP should fail. Multiple blowout preventers of the same type are frequently provided for redundancy, to ensure effectiveness of fail-safe devices.

BOPs commonly use two position, three-way valves such as sub plate mounted (SPM) valves for control of the BOP. One common design for the SPM valves includes a valve housing with an open interior defining a longitudinal axis. The open interior is fluidly communicable with a supply port, a discharge port, and a vent port. A spool is selectively movable through the open interior, along the longitudinal axis, to control fluid flow between the supply port and the discharge port. The spool can be moved to a first position within the open interior wherein fluid is permitted to flow between the supply port and the discharge port thereby arranging the valve in an open configuration. The spool can also be moved to a second position within the open interior where fluid is prevented from flowing between the supply port and the discharge port thereby arranging the valve in a closed configuration. Thus the valve is operable to open and close hydraulic circuits, which may include additional valves for operating the ram of a blowout preventer.

When a SPM valve actuates between open and closed configurations, there is a brief amount of time where fluid can flow from the supply port to both the discharge port and the vent port of the valve. This condition is known as interflowing and results in very little back pressure on the upstream system. Because of this, flow entering the three-way valve can rapidly increase at this period of interflow, followed by a rapid decrease when the valve completes the actuation cycle to the open or closed configurations.

The rapid increase and decrease of fluid flow often results in water hammer or hydraulic shock on the control system. Water hammer occurs when a pressure surge of fluid in motion is forced to stop or change directions suddenly. This shock occurs every time a three-way valve is actuated between the open and closed positions and can cause wear and tear on the hydraulic components of the BOP. Eventually this can require downtime and maintenance to repair the damage done by the repeated water hammer cycles on the hydraulic components.

SUMMARY

One embodiment of the present technology provides for an automatic choking hydraulic shock reduction valve including an inlet valve body with an oil dampening chamber, an orifice within the oil dampening chamber, a flow dampener positioned between an inlet of the valve and the orifice, and a spring between the valve body and the orifice. The valve can be pressure compensated based on the depth pressure of ambient fluid in its operating environment.

In some embodiments, the oil dampening chamber can be substantially filled with an oil. In alternate embodiments, the orifice can be axially moveable between an upstream side and a downstream side of the oil dampening chamber. In other embodiments, the upstream and downstream sides of the oil dampening chamber can be fluidly connected through a bi-directional flow control valve.

In other embodiments, the spring can exert a force on the orifice in the direction of the valve inlet. In some embodiments, working fluid flowing through the valve can exert a greater force on the orifice than the spring, which can result in the orifice moving from a choked position to an open position. In other embodiments, oil in the oil dampening chamber can delay the movement of the orifice. In alternate embodiments, the orifice can move from the open position to the choked position when working fluid flow through the valve is stopped.

In other embodiments the valve can be constructed with additive manufacturing.

Another embodiment provides for an oil dampening system including an upstream oil dampening chamber, a downstream oil dampening chamber, and an axially moveable orifice between the two oil dampening chambers. The oil dampening system can be pressure compensated based on the depth pressure of ambient fluid in its operating environment.

In alternate embodiments the upstream and downstream oil dampening chambers can be substantially filled with an oil. In some embodiments, the upstream oil dampening chamber can be connected to a bi-directional flow control valve through an upstream port. In other embodiments, the downstream oil dampening chamber can be connected to a bi-directional flow control valve through a downstream port. In alternative embodiments the upstream oil dampening chamber can be connected to an upstream remote piloting valve. In other embodiments the downstream oil dampening chamber can be connected to a downstream remote piloting valve.

In other embodiments the orifice can move axially in the direction of the valve outlet. In some embodiments, this movement can force oil from the downstream oil dampening chamber and through the downstream port, bi-directional flow control valve, upstream port, and into the upstream oil dampening chamber. In alternate embodiments the orifice can move axially in the direction of the valve inlet. In other embodiments, this movement can force oil from the upstream oil dampening chamber and through the upstream port, bi-directional flow control valve, downstream port, and into the downstream oil dampening chamber.

A further embodiment provides for manufacturing an automatic choking hydraulic shock reduction valve including an upstream valve body, downstream valve body, orifice, flow dampener, and spring. In an embodiment, the orifice can be axially moveable between the upstream and downstream valve bodies. In some embodiments the spring can exert a force on the orifice away from the downstream valve body.

In some embodiments the valve can be assembled such that there can be an upstream oil dampening chamber between the orifice and upstream valve body. In other embodiments the valve can be assembled such that there can be a downstream oil dampening chamber between the orifice and the downstream valve body. In alternate embodiments, both the upstream and downstream dampening chambers can be substantially filled with an oil. In another embodiment the upstream and downstream dampening chambers can be fluidly connected through a bi-directional flow control valve.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
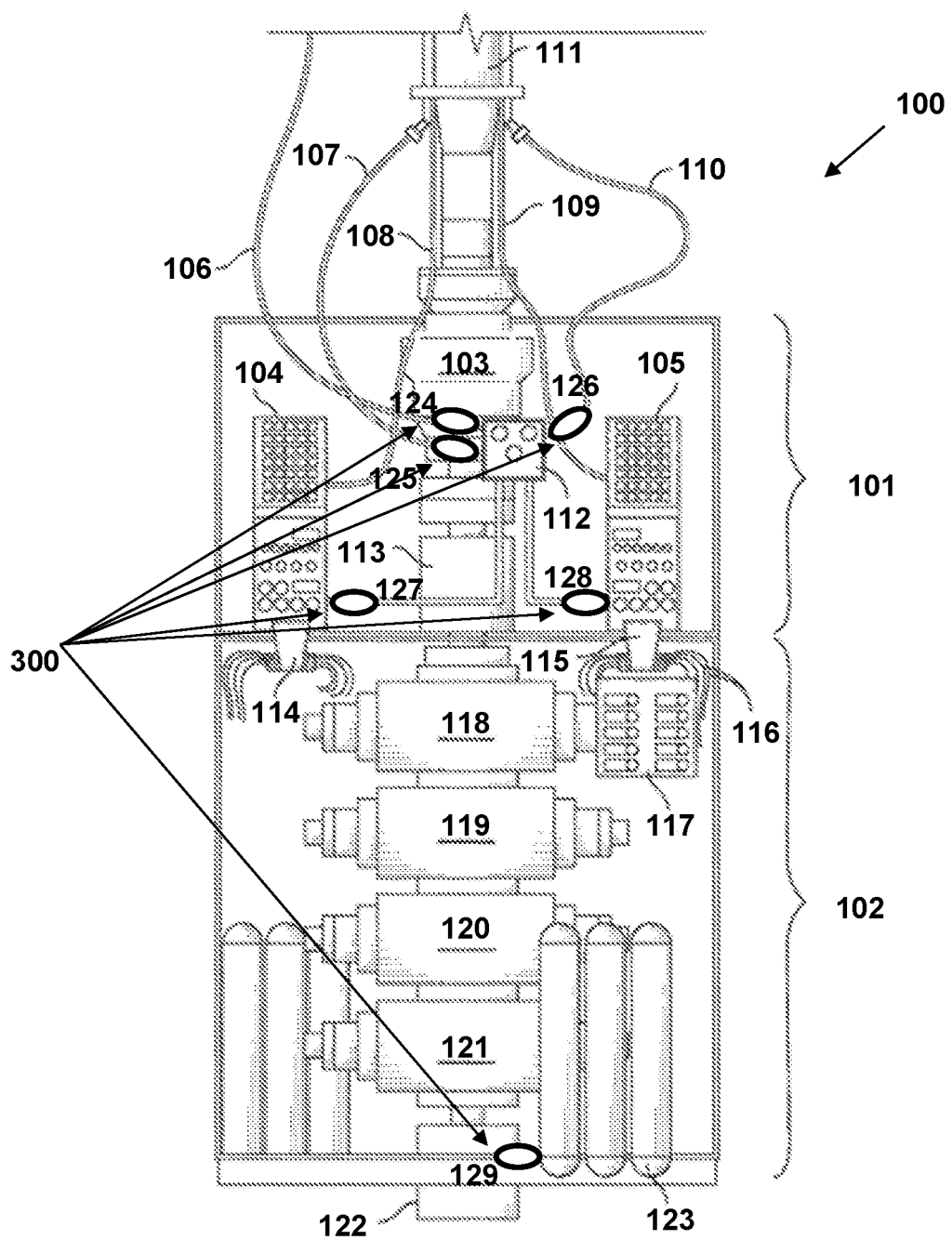
FIG. 1 is a representative system overview of a BOP stack.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Referring now to FIG. 1, a BOP stack 100 is pictured, which includes a lower marine riser package (LMRP) 101 and a lower stack 102. LMRP 101 includes an annular 103, a blue control pod 104, and a yellow control pod 105. Hotline 106, blue conduit 107, and yellow conduit 110 proceed downwardly from riser 111 into LMRP 101 and through conduit manifold 112 to the control pods 104 and 105. Blue power and communications line 108 and yellow power and communications line 109 proceed to control pods 104 and 105 respectively. LMRP connector 113 connects LMRP 101 to lower stack 102. Hydraulically activated wedges 114 and 115 are disposed to suspend connectable hoses or pipes 116, which can be connected to shuttle panels.

Lower stack 102 further includes shuttle panel 117, blind shear ram BOP 118, casing shear ram 119, first pipe ram 120, and second pipe ram 121. BOP stack 100 is disposed above wellhead connection 122. Lower stack 102 further includes stack-mounted accumulators 123 containing a necessary amount of hydraulic fluid.

Automatic choking shock reduction valves 300 are shown here on the BOP stack 100. One automatic choking valve 124 is located on the hotline 106 upstream of the conduit manifold 112. A second automatic choking valve 125 is located on the blue conduit 107 also upstream of the conduit manifold 112. Another automatic choking valve 126 is located on yellow conduit 110 which is upstream of the conduit manifold 112. Automatic choking valves 127 and 128 are located on the lines running from the conduit manifold 112 to the control pods 104 and 105. An automatic choking valve 129 would also be located on the outlet of the stack-mounted accumulators 123.

Figure 2A:
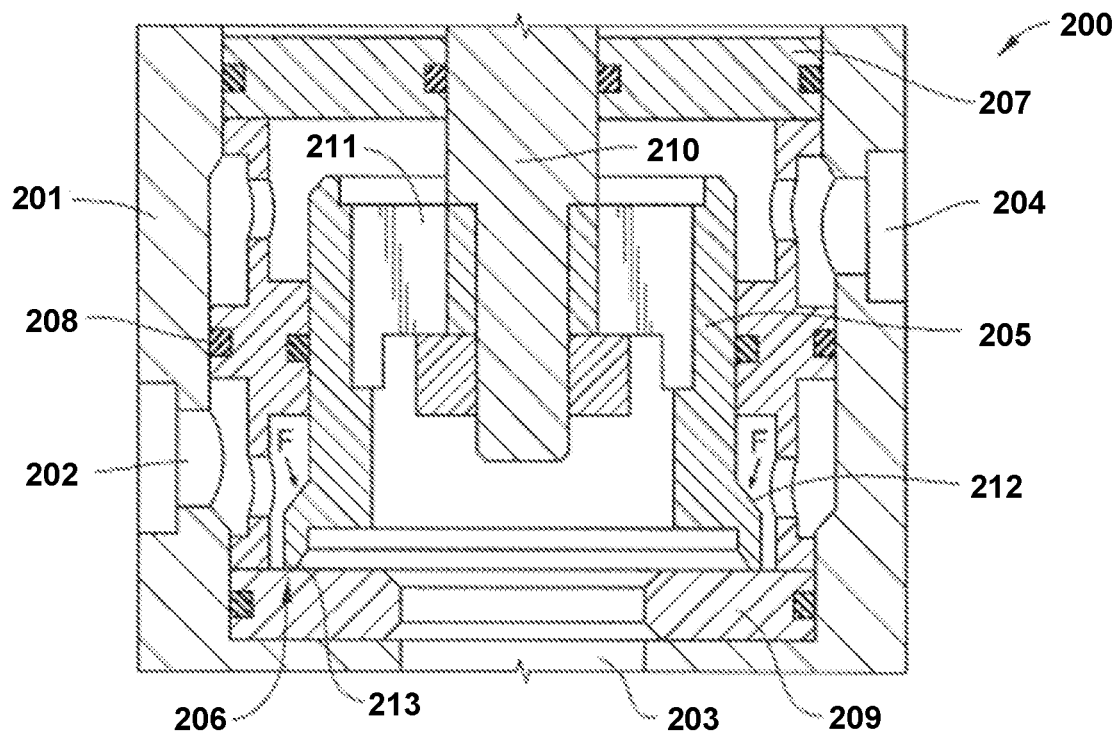
FIG. 2A is a schematic view of a sample normally open SPM valve illustrating forces applied to the spool by a working fluid when the valve is in a closed configuration.

Referring to FIG. 2A, sample SPM valve 200 is illustrated schematically in the closed configuration wherein lower sealing face 206 of spool 205 is engaged with lower valve seat 209. A relatively high surface area on an exterior of spool 205 is in contact with working fluid "F" since a greater axial length of spool 205 is disposed beneath spool seal 208. Lower sealing face 206 includes a sealing face taper 213, which is an inward and downward facing tapered surface. When SPM valve 200 is in the closed configuration, the pressurized working fluid "F" applies a force on the exterior of the spool 205, which includes upward facing shoulder 212. Spool seal 208 contains working fluid "F" in an annular region around upward facing shoulder 212 when spool 205 is in the second position. In this manner, the high pressure of the working fluid "F" presses lower sealing face 206 when valve 200 is arranged in the closed configuration. The interior of spool 205 is exposed to the relatively low pressure of the subsea environment through vent port 204. Thus, the working fluid "F" generates a pressure differential between the interior and exterior of spool 205, and thereby serves to urge spool 205 in the direction of lower valve seat 209 to maintain valve 200 in the closed position.

Figure 2B:
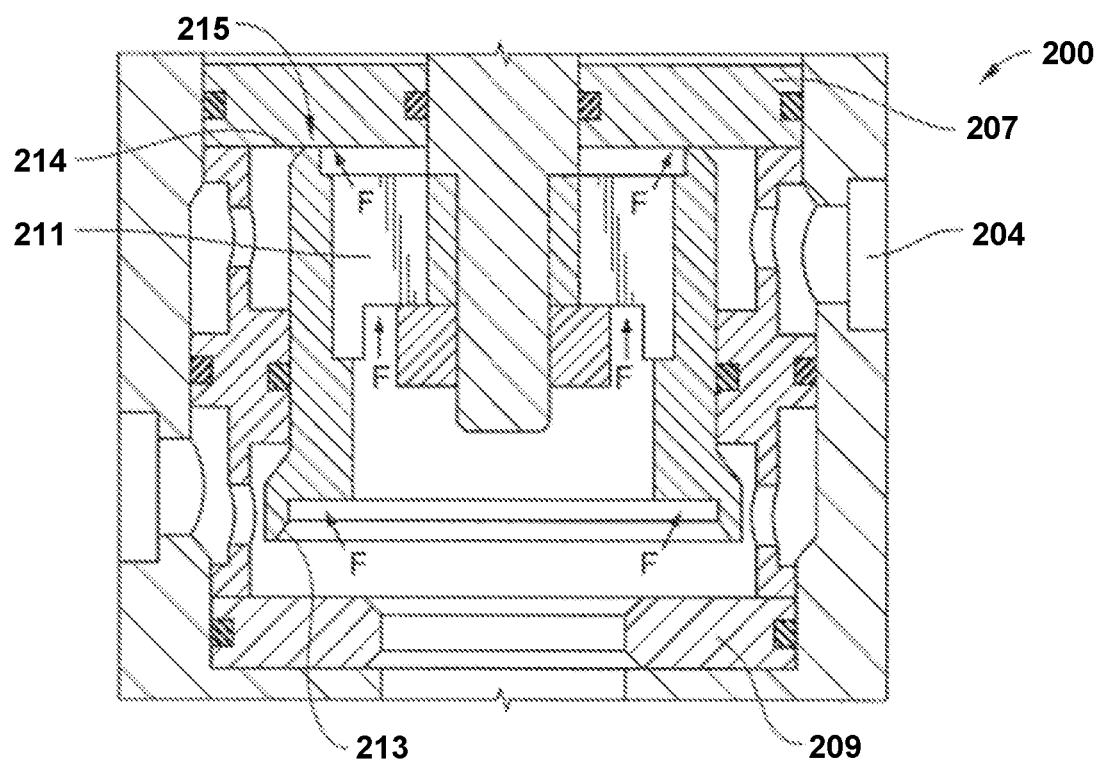
FIG. 2B is a schematic view of a sample normally open SPM valve illustrating forces applied to the spool by a working fluid when the valve is in an open configuration.

Referring to FIG. 2B, valve 200 is illustrated schematically in the open configuration wherein upper sealing face 215 of spool 205 engages upper valve seat 207. Upper sealing face 215 includes an upper sealing face taper 214, which is an outward and upward facing tapered surface. When valve 200 is arranged in the open configuration, the working fluid "F" is permitted to flow into the interior of spool 205, and thus the relatively high pressure of the working fluid "F" acts on the interior of spool 205 to press upper sealing face 215 upward into upper valve seat 207. Fins 211, valve stem 210, and sealing face taper 213 are all exposed to the relatively high pressure of the working fluid "F." The pressure of the working fluid acting on these elements serves to bias spool 205 toward the upper valve seat 207. The working fluid "F" is isolated from the exterior of spool 205 at the upper sealing face 215 and thus the relatively high pressure of the working fluid. "F" does not act upon the upper sealing face taper 214 of the upper sealing face 215 when valve 200 is in the open configuration. The working fluid "F" again generates a pressure differential, and thereby serves to urge spool 205 in the direction of upper valve seat 207 to maintain valve 200 in the open configuration.

As illustrated by FIG. 2B, supply port 202 is arranged with respect to discharge port 203 and spool 205 such that spool 205 can be axially spaced from lower valve 209 when valve 200 is arranged in the open configuration. Since discharge port 203 extends axially through lower valve seat 209, working fluid "F" is communicable between the supply port 202 and discharge port 203 along a fluid flow path extending between spool 205 and lower valve seat 209. The fluid flow path is defined exclusively on an exterior of spool 205, and thus, it is not necessary for working fluid "F" to flow axially through spool 205 when valve 200 is arranged in the open configuration.

Figure 2C:
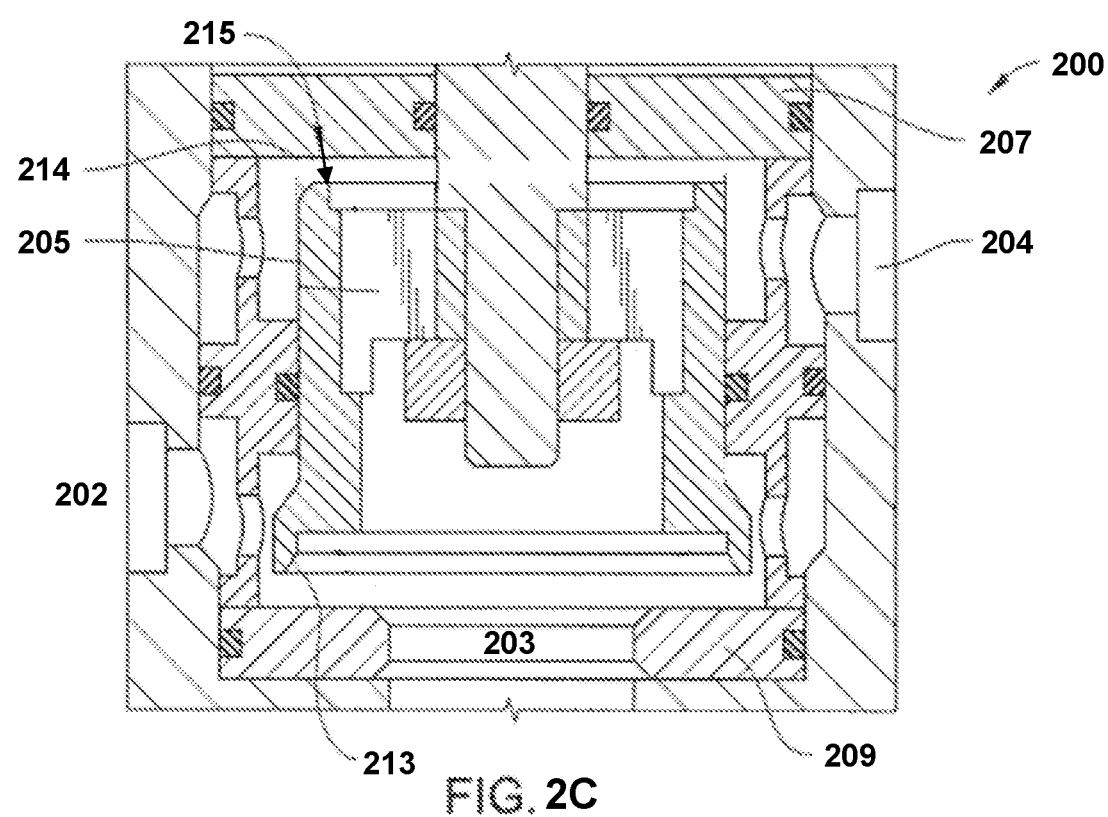
FIG. 2C is a schematic view of a sample SPM valve illustrating a transient position between open and closed configurations.

Referring to FIG. 2C, valve 200 is illustrated schematically in a transient position between the open and closed configurations. In this configuration, the spool 205 is not engaged with either the lower valve seat 209 at the lower sealing face 206 nor the upper valve seat 207 at the upper sealing face 215. Working fluid can enter the valve at the supply port 202 and flow through the valve 200 towards both the discharge port 203 and the vent port 204 by flowing through the spool 205. This interflow condition results in high fluid flow through the valve 200. When the valve 200 reaches a final open or closed configuration as shown in FIGS. 2A and 2B, fluid flow to either the discharge port 203 or vent port 204 is abruptly stopped or decelerated. This abrupt change in fluid flow velocity causes hydraulic shock and water hammer.

Figure 3:
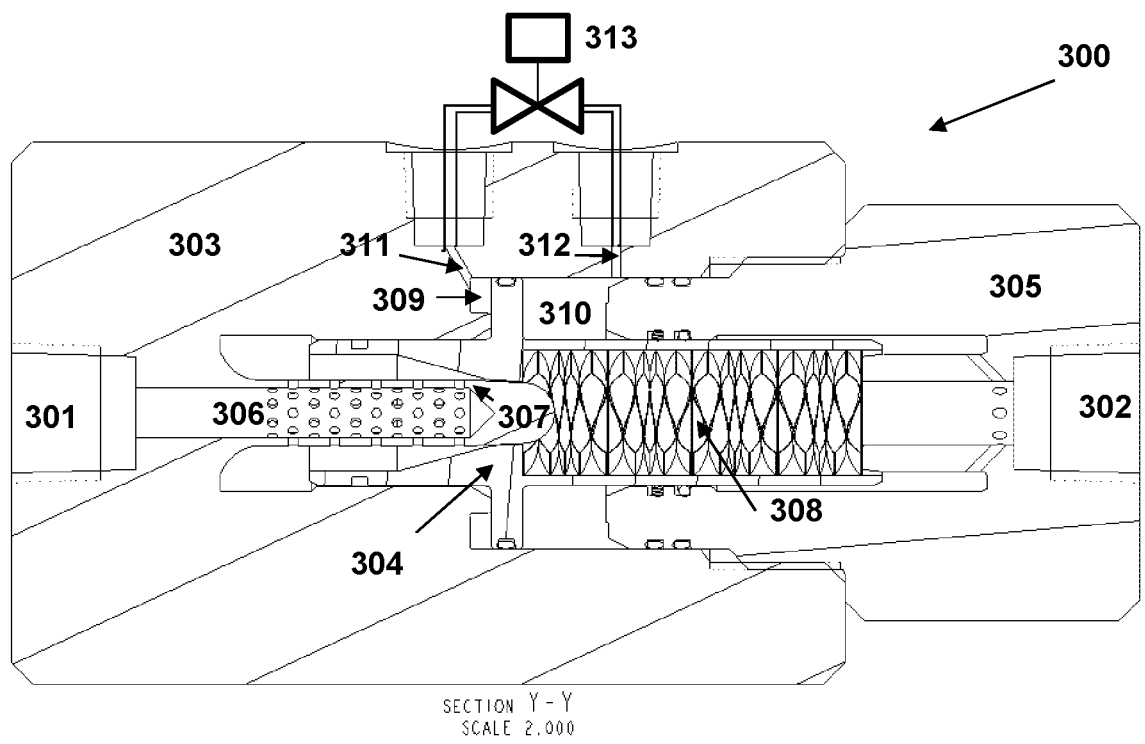
FIG. 3 is a schematic view of an automatic choking hydraulic shock reduction valve.

Referring to FIG. 3, automatic choking valve 300 is illustrated schematically in a choked position. The valve has an inlet 301 and outlet 302 as well as an upstream valve body 303 and downstream valve body 305. Between the upstream valve body 303 and downstream valve body 305 is an orifice 304. The orifice 304 can move axially towards the valve outlet 302 and away from the valve inlet 301 or towards the valve inlet 301 and away from the valve outlet 302. The orifice 304 moves within an oil dampening chamber 309 and 310 between the upstream valve body 303 and downstream valve body 305. Between the valve inlet 301 and the orifice 304 is a flow dampener 306. The flow dampener 306 is a cylindrical tube with a capped downstream end and a number of holes throughout the side of the cylinder. Working fluid entering the valve through valve inlet 301 enters the flow dampener 306 and passes through the holes to the space between the flow dampener 306 and the orifice 304. The fluid then passes through the gap 307 between the flow dampener 306 and the orifice 304 before continuing to the valve outlet 302.

The orifice 304 sits in an oil dampening chamber comprised of an upstream oil dampening chamber 309 and a downstream oil dampening chamber 310. Both upstream and downstream oil dampening chambers 309 and 310 are filled with oil. The upstream and downstream oil dampening chambers 309 and 310 are fluidly connected through a bi-directional flow control valve 313 which sits on the upstream valve body 303. Oil in the upstream oil dampening chamber 309 can enter or exit through the upstream port 311 to get to or from the bi-directional flow control valve 313. Similarly, oil in the downstream oil dampening chamber 310 can enter or exit the downstream port 312 to get to or from the bi-directional flow control valve 313.

Instead of a bi-directional flow control valve 313, the upstream port 311 can be connected to a remote piloting valve and the downstream port 312 can also be connected to a separate remote piloting valves. These valves allow for manual remote control of the oil in the upstream and downstream oil dampening chambers 309 and 310 and the orifice 304 by manually adding or removing oil from the oil dampening chambers 309 and 310. This can result in the orifice 304 remaining in the choked position during working fluid flow and the orifice 304 remaining in the open position with no working fluid flow through the valve.

Downstream of the orifice 304 there is a spring 308 in contact with the downstream valve body 305 and orifice 304. The spring 308 imparts a force on the orifice 304 in the direction of the upstream oil dampening chamber 309. This force moves the orifice 304 into the upstream oil dampening chamber 309 forcing the oil out of the upstream port 311 through the bi-directional flow control valve 313 and downstream port 312 and into the downstream oil dampening chamber 310.

The oil can be either a mineral oil or some other type of suitable fluid. The oil dampening system consisting of the orifice 304, upstream and downstream oil dampening chambers 309 and 310, upstream and downstream ports 311 and 312, and bi-directional flow control valve 313 is pressure compensated. Pressure compensation allows for proper function of the valve at any depth under the surface of the fluid that the BOP is located at.

Figure 4A:
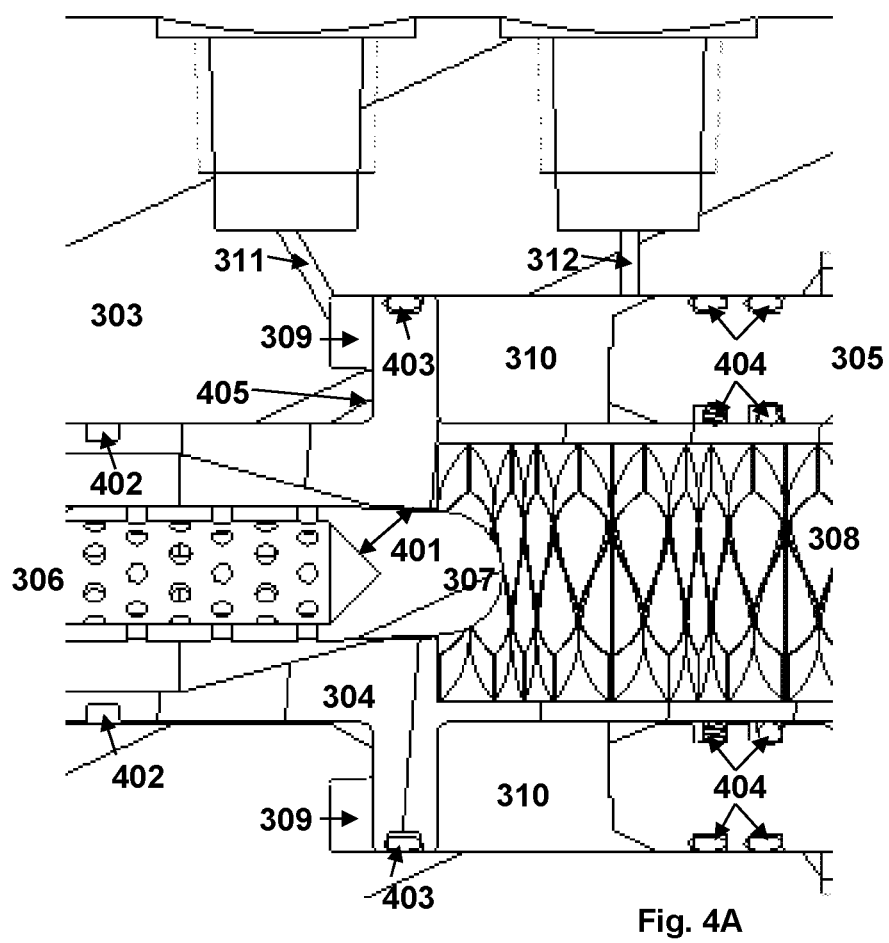
FIG. 4A is a schematic view of the automatic choking hydraulic shock reduction valve in a choked position.

Referring now to FIG. 4A, automatic choking valve 300 is schematically illustrated in a choked position with a focus on the orifice 304. This view provides further detail on the seals between the upstream valve body 303, orifice 304, and downstream valve body 305. Upstream seal 402 seals the space between the upstream valve body 303 and the orifice 403 preventing working fluids from entering the upstream oil dampening chamber 309 and also preventing oil from escaping the upstream oil dampening chamber 309. Orifice seal 403 seals between the orifice 304 and the upstream valve body 303. This prevents oil from passing between the oil dampening chambers 309 and 310 without first going through the ports 311 and 312 and the bi-directional flow control valve 313. Downstream seals 404 seal between the upstream valve body 303, orifice 304, and downstream valve body 305. These seals prevent working fluid from entering the downstream oil dampening chamber 310 and also prevents oil from escaping the downstream oil dampening chamber 310.

In this configuration, there is no flow through the valve 300 at this time. Because of this, spring 308 has forced orifice 304 into a choked position. In this position, the oil in upstream oil dampening chamber 309 is at a minimum and oil in the downstream oil dampening chamber 310 is at a maximum. Orifice 304 is abutting an inner edge 405 of the upstream valve body 303 such that the gap 307 between the orifice 304 and the flow dampener 306 is at a minimum distance 401. This results in a larger pressure drop when fluid is first introduced into the valve 300 and flows through the gap 307 between the orifice 304 and the flow dampener 306. This larger pressure drop prevents water hammer and hydraulic shock in downstream equipment by limiting the acceleration of fluid.

Figure 4B:
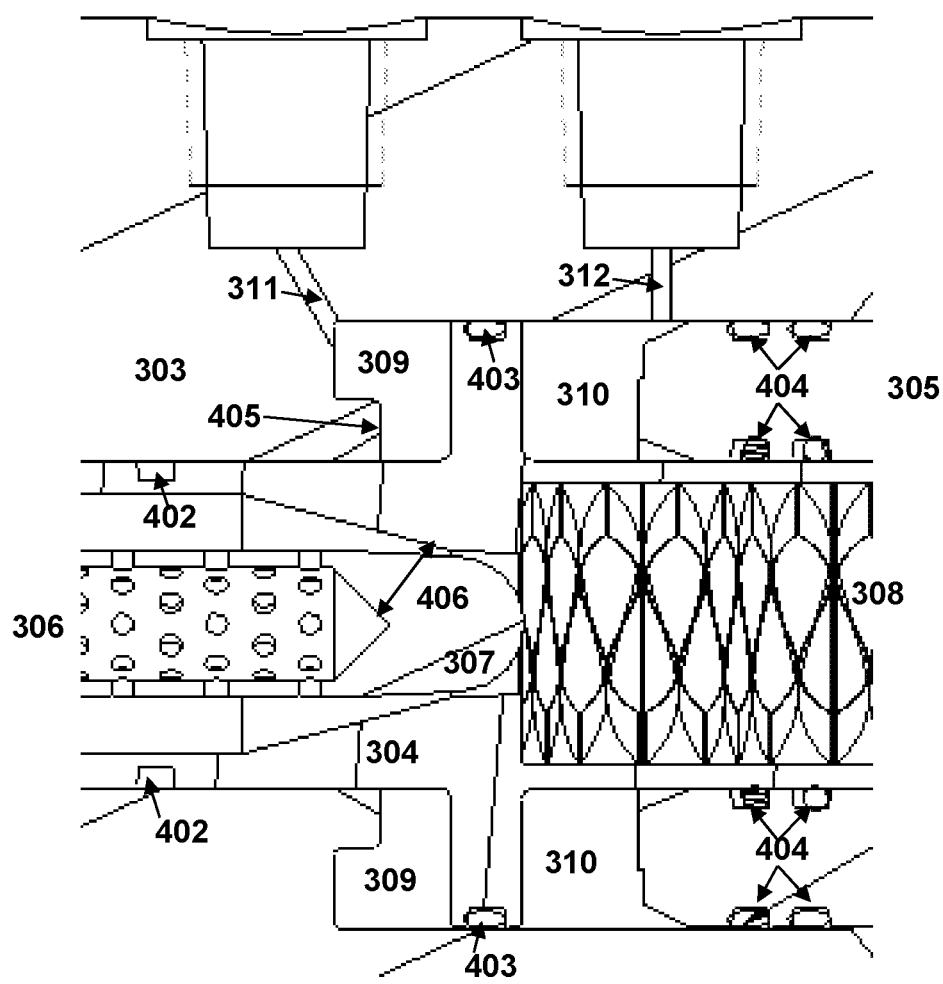
FIG. 4B is a schematic view of the automatic choking hydraulic shock reduction valve in a transient position.

Referring to FIG. 4B, automatic choking valve 300 is illustrated schematically in a transient state. In this state, a working fluid flowing through the valve has overcome the force of the spring 308 and the oil in the downstream oil dampening chamber 310 resulting in forcing the orifice 304 axially into the downstream oil dampening chamber 310. This, in turn, forces the oil in the downstream oil dampening chamber 310 through the downstream port 312 and into the bi-directional flow control valve 313. The oil is continuing through the upstream port 311 and into the upstream oil dampening chamber 309 which is increasing in volume due to the movement of the orifice 304 away from the inner edge 405 of the upstream valve body 303. The result of this movement is that the gap 307 between the orifice 304 and the flow dampener 306 increases in size to a larger distance 406. The gap 307 continues to increase in length as the orifice 304 continues to move axially towards the valve outlet. Working fluid flowing through this larger gap 307 encounters less resistance resulting in a lower pressure drop.

Figure 4C:
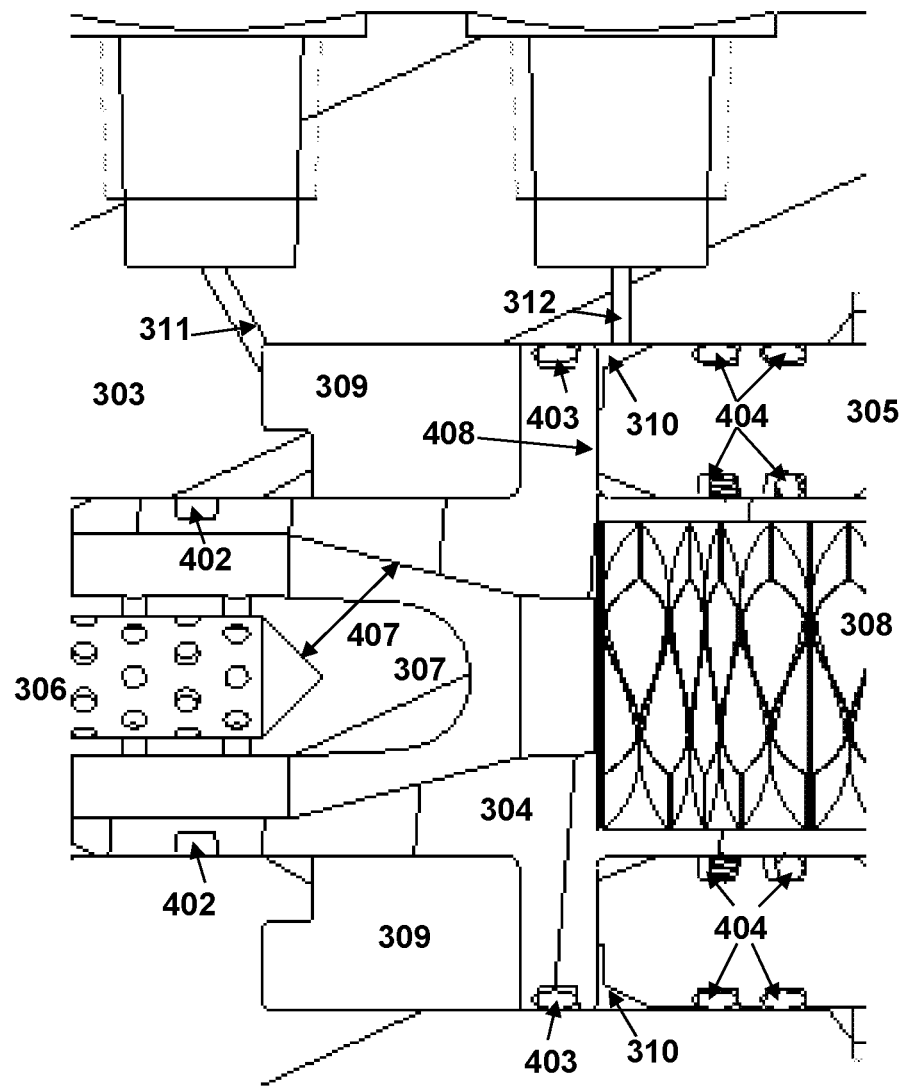
FIG. 4C is a schematic view of the automatic choking hydraulic shock reduction valve in an open position.

Referring now to FIG. 4C, automatic choking valve 300 is shown schematically with the orifice 304 in an open position. Here, working fluid flow through the valve has moved the orifice 304 such that it is abutting an inner edge 408 of the downstream valve body 305. This results in the oil volume in the downstream oil dampening chamber 309 being at a maximum and the oil volume in the upstream oil dampening chamber 310 being at a minimum. Further, the gap 307 is at a maximum distance 407. This results in a minimal pressure drop of the working fluid as it passes through the gap 307 between the flow dampener 306 and the orifice 304.

When the working fluid stops flowing through the valve 300, there is no force on the orifice 304 towards the valve outlet. The only remaining force on the orifice 304 is the spring 308 which exerts a force towards the valve inlet. Beginning at FIG. 4C, the orifice 304 now moves back in the direction of the inner edge 405 of the upstream valve body 304. This forces the oil from the upstream oil dampening chamber 309 through the upstream port 311 and into the bi-directional flow control valve 313. The oil continues through downstream port 312 and into the downstream oil dampening chamber 310. The orifice continues to travel through the transient position shown in FIG. 4B and ends in the choked position shown in FIG. 4A. There is no working fluid flow through the valve 300 during this process. The valve 300 is designed such that it takes longer for the orifice 304 to traverse from the choked position in FIG. 4A to the open position in FIG. 4C than it takes to traverse from the open position in FIG. 4C to the choked position in FIG. 4A. This results in a gradual increase in flow rate after flow is introduced to the valve 300 as the gap 307 increases in size due to the movement of the orifice 304 through the downstream oil dampening chamber 310. When flow to the valve 300 is stopped, the orifice 304 quickly resets to a choked position from the force of the spring 308 so that flow is restricted during the next working fluid flow cycle through the valve.

In instances where the bi-directional flow control valve 313 is replaced with individual remote piloting valves connected to the upstream and downstream ports 311 and 312 the position of the orifice 304 can be manually controlled irrespective of whether there is working fluid flow through the valve 300 or not. By manually controlling the amount of oil in the upstream and downstream oil dampening chambers 309 and 310, the position of the orifice 304 can also be manually controlled. By keeping the downstream oil dampening chamber 310 filled with oil, the valve 300 can be kept in a choked position indefinitely, forcing a larger pressure drop when working fluid flows through the valve. Conversely, keeping the upstream oil dampening chamber 309 filled with oil will result in the valve 300 being kept in the open position indefinitely, resulting in a minimal pressure drop of the working fluid.

The valve is further constructed using additive manufacturing techniques. These techniques result in a valve with fewer individual parts that are easier to manufacture and assemble than traditional manufacturing methods. Fewer parts decreases the amount of failure modes in the assembly. This particular design cannot be machined using traditional methods.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. An automatic choking hydraulic shock reduction valve, the valve comprising:
   a valve body;
   a piston element slidably positioned within the valve body, wherein the piston element has an orifice formed axially therethrough;
   an oil dampening chamber positioned between the piston element and the valve body, wherein the oil dampening chamber is sealed from the orifice through the piston element;
   a flow dampener positioned between an inlet of the valve and the orifice of the piston element, wherein the piston element is movable relative to the flow dampener; and
   a spring positioned between the valved body and the piston element;
   wherein the valve is pressured compensated for a depth pressure of an ambient fluid.

2. The valve of claim 1, wherein the oil dampening chamber is substantially filled with an oil.

3. The valve of claim 1, wherein the piston element is axially moveable within the oil dampening chamber.

4. The valve of claim 1, wherein the piston element seals between an upstream side and a downstream side of the oil dampening chamber.

5. The valve of claim 1, wherein the spring exerts a force on the piston element towards the inlet of the valve.

6. The valve of claim 5, wherein a working fluid exerts a greater force on the piston element towards a valve outlet than the force of the spring towards the valve inlet.

7. The valve of claim 1, wherein when the piston element is in an open position, the inlet of the valve is in fluid communication with an outlet of the valve via a gap between the flow dampener and the orifice in the piston element.

8. The valve of claim 7, wherein when the piston element is in a choked position, the gap between the flow dampener and the orifice of the piston element is reduced to restrict fluid communication between the inlet of the valve and an outlet of the valve.

9. The valve of claim 1, wherein the valve is constructed using additive manufacturing.

10. The valve of claim 1, wherein the flow dampener comprises a capped tube having a working fluid chamber formed therein and a plurality of holes formed along a side of the capped tube, and wherein the inlet of the valve is in fluid communication with the orifice of the piston element via the working fluid chamber and the plurality of holes.

11. An oil dampening system, the system comprising:
an upstream oil dampening chamber substantially filled with an oil;
a downstream oil dampening chamber substantially filled with the oil;
a piston element between the upstream oil dampening chamber and the downstream oil dampening chamber that is axially moveable through the system, wherein the piston element seals the upstream oil dampening chamber from the downstream oil dampening chamber;
an upstream port fluidly connected to the upstream oil dampening chamber;
a downstream port fluidly connected to the downstream oil dampening chamber;
where the oil dampening system is pressure compensated for a depth pressure of an ambient fluid.

12. The oil dampening system of claim 11, wherein a bi-directional flow control valve fluidly connects the upstream and downstream ports.

13. The oil dampening system of claim 12 wherein movement of the piston element axially toward a valve outlet forces oil in the downstream oil dampening chamber to flow through the downstream port, the bi-directional flow control valve, the upstream port, and into the upstream oil dampening chamber.

14. The oil dampening system of claim 12 wherein movement of the piston element axially toward a valve inlet forces oil in the upstream oil dampening chamber to flow through the upstream port, the bi-directional flow control valve, the downstream port, and into the downstream oil dampening chamber.

15. The oil dampening system of claim 11 wherein the upstream port is connected to an upstream remote piloting valve and the downstream port is connected to a downstream remote piloting valve.

16. The oil dampening system of claim 11 wherein the system is made by additive manufacturing.

17. A method of manufacturing an automatic choking hydraulic shock reduction valve comprising:
manufacturing an upstream valve body, downstream valve body, a piston element, a flow dampener, and a spring, wherein the piston element has an orifice formed axially through the piston element;
assembling the valve such that the piston element is axially moveable between the upstream valve body and the downstream valve body and the spring exerts a force on the piston element away from the downstream valve body; and
positioning the flow dampener at least partially through the orifice of the piston element.

18. The method of claim 17, further comprising: substantially filling an upstream oil dampening chamber between the upstream valve body and the piston element and a downstream oil dampening chamber between the downstream valve body and the piston element with an oil.

19. The method of claim 18 further comprising: fluidly connecting the upstream oil dampening chamber with the downstream oil dampening chamber through a bi-directional flow control valve.

20. The method of claim 17 wherein the upstream valve body, downstream valve body, piston element, flow dampener, and spring are manufactured with additive manufacturing.

21. The valve of claim 1, wherein the upstream side of the oil dampening chamber and the downstream side of the oil dampening chamber are fluidly connected through a bi-directional flow control valve.

* * * * *